(12) United States Patent
Jung et al.

(10) Patent No.: US 7,227,590 B2
(45) Date of Patent: Jun. 5, 2007

(54) DIGITAL TV WITH OPERATING SYSTEM AND METHOD OF DRIVING SAME

(75) Inventors: Byung Dal Jung, Anyang-si (KR); Chun Sung Kim, Seoul (KR); Nam Seok Jo, Osan-gi (KR); Jong Seok Park, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 413 days.

(21) Appl. No.: 10/688,679

(22) Filed: Oct. 17, 2003

(65) Prior Publication Data
US 2004/0085479 A1    May 6, 2004

(30) Foreign Application Priority Data
Oct. 22, 2002  (KR)  ................. 10-2002-0064583

(51) Int. Cl.
*H04N 5/44* (2006.01)
*G11B 27/00* (2006.01)

(52) U.S. Cl. .............. 348/725; 348/730; 348/553; 715/718

(58) Field of Classification Search .......... 348/725, 348/552, 180, 553, 714, 571, 705, 730; 700/21, 700/81, 82; 714/47; 715/718
See application file for complete search history.

(56) References Cited
U.S. PATENT DOCUMENTS

| 4,872,106 A | 10/1989 | Slater |
| 5,987,621 A | 11/1999 | Duso et al. |
| 6,012,137 A * | 1/2000 | Bublil et al. ............ 712/36 |
| 6,050,718 A * | 4/2000 | Schena et al. ........... 700/85 |
| 6,347,294 B1 * | 2/2002 | Booker et al. ........... 703/28 |
| 6,587,635 B1 * | 7/2003 | Subramanian et al. ..... 386/68 |
| 2001/0029612 A1 * | 10/2001 | Harnois .................. 725/86 |
| 2002/0067437 A1 * | 6/2002 | Tsubouchi et al. ....... 348/725 |

FOREIGN PATENT DOCUMENTS

| EP | 0 411 295 A2 | 6/1990 |
| GB | 2 348 978 A | 10/2000 |
| WO | WO 02/067120 | 8/2002 |

* cited by examiner

*Primary Examiner*—Victor R. Kostak
(74) *Attorney, Agent, or Firm*—Lee, Hong, Degerman, Kang & Schmadeka

(57) ABSTRACT

A digital TV and a driving method thereof enable a user to view the digital TV without interruption even if the present operating system is in an abnormal state. The digital TV includes a digital TV receiving part for receiving and decoding a broadcasting stream from an outside, a host CPU for controlling the digital TV receiving part, a local CPU for controlling the digital TV receiving part if the host CPU operates in an abnormal state, and a programmable logic device for switching the control of the digital TV receiving part from the host CPU to the local CPU if the host CPU operates in the abnormal state.

11 Claims, 3 Drawing Sheets

DIGITAL TV WITH OPERATING SYSTEM AND METHOD OF DRIVING SAME

This application claims the benefit of the Korean Application No. P2002-64583 filed on Oct. 22, 2003, which is hereby incorporated by reference.

BACKGROUND OF THE INVENTION

1. Field of the Invention

The present invention relates to a digital TV (television receiver), and more particularly to a digital TV and a driving method thereof which enable a user to view the digital TV without interruption even if the presently used operating system is in an abnormal state.

2. Description of the Related Art

Web boxes or Internet TVs mainly use Windows™ or Linux™ as their operating system for the convenience of users.

However, if the operating system becomes unstable, the system should be rebooted. If the operating system is rebooted as above, all application programs, which are operating in the present system, should be terminated.

In order to solve this problem, the existing digital TV receivers heighten their reliability by using an embedded operating system having a high stability. However, such an embedded operating system has the drawbacks in that it cannot provide a user-friendly interface.

Also, the embedded operation system has many difficulties in implementing functions, which electric home appliances should necessarily have, by a web browser and so on.

Accordingly, in order to solve the problems, many manufacturers have developed many PC-based digital TVs having the operating system such as Windows™ or Linux™.

However, if many applications are simultaneously driven under the above-described operating system, the reliability of the operating system may deteriorate. That is, due to an error of the operating system, the operation of the PC system may be stopped. As a result, if the rebooting of the PC causes any problem in a receiving part of the digital TV, the use value of the PC-based digital TV may deteriorate. Accordingly, even if the operating system operates in error, it is required for the user to continuously view the PC-based digital TV.

In the PC-based digital TV operating system, due to the error of the applications programs, the system is stopped more frequently than the embedded operating system. Accordingly, if the receiving part of the digital TV can be controlled even though the system is stopped due to the error of the application programs, the viewer will be able to view the digital TV without interruption.

SUMMARY OF THE INVENTION

Accordingly, the present invention is directed to a digital TV and a driving method thereof that substantially obviate one or more problems due to limitations and disadvantages of the related art.

An object of the present invention is to provide a digital TV and a driving method thereof which can independently control a receiving part of the digital TV having an operating system that operates in a personal computer (PC) even if the PC is rebooted due to an abnormal operation of the operating system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital TV includes a digital TV receiving part for receiving and decoding a broadcasting stream from an outside, a host CPU for controlling the digital TV receiving part, a local CPU for controlling the digital TV receiving part if the host CPU operates in an abnormal state, and a programmable logic device for switching the control of the digital TV receiving part from the host CPU to the local CPU if the host CPU operates in the abnormal state.

Here, the digital TV may further include a shared memory periodically accessed by the host CPU and the local CPU at predetermined intervals in order to check whether the host CPU operates in a normal state.

The local CPU in the digital TV receiving part may access the shared memory through a local bus, and the host CPU outside the digital TV receiving part may access the shared memory through a peripheral component interconnect (PCI) bus.

Also, the shared memory has a flag area for recording a flag that indicates an operating state of the host CPU, and the host CPU records a flag '1' in the flag area for a predetermined period.

The local CPU periodically checks the flag, and if the checked flag is '0', it judges that the host CPU operates in the abnormal state, and controls the digital TV receiving part, while if the checked flag is '1', it judges that the host CPU operates in the normal state, and does not control the digital TV receiving part.

Also, the local CPU periodically checks the flag, and if the checked flag is '1', it changes the flag '1' recorded in the flag area to the flag '0'.

In another aspect of the present invention, there is provided a method of driving a digital TV having a host CPU, a local CPU and a shared memory, which includes driving the digital TV through the host CPU, periodically recording a flag that indicates an operating state of the host CPU in the shared memory, judging whether the host CPU operates in an abnormal state by periodically checking the flag recorded in the shared memory, and if it is checked that the host CPU operates in the abnormal state, driving the digital TV through the local CPU instead of the host CPU.

If it is checked that the host CPU operates in a normal state, the flag recorded in the shared memory is updated.

The method of driving the digital TV may further includes, after the step of driving the digital TV through the local CPU, judging whether the host CPU operates in a normal state by periodically checking the flag recorded in the shared memory, and if it is checked that the host CPU operates in the normal state, driving the digital TV through the host CPU instead of the local CPU.

In still another aspect of the present invention, there is provided a method of driving a digital TV having a host CPU, a local CPU and a shared memory, which includes driving the digital TV through the host CPU, periodically recording a flag that indicates an operating state of the host CPU in the shared memory, periodically checking the flag recorded in the shared memory, if it is checked that the flag is '1', judging that the host CPU operates in a normal state and updating the flag as '0', while if it is checked that the flag is '0', judging that the host CPU operates in an abnormal state and driving the digital TV through the local CPU instead of the host CPU, periodically checking the flag recorded in the shared memory, and if it is checked that the flag is '1', judging that the host CPU operates in the normal state, driving the digital TV through the host CPU instead of the local CPU, and updating the flag as '0'.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
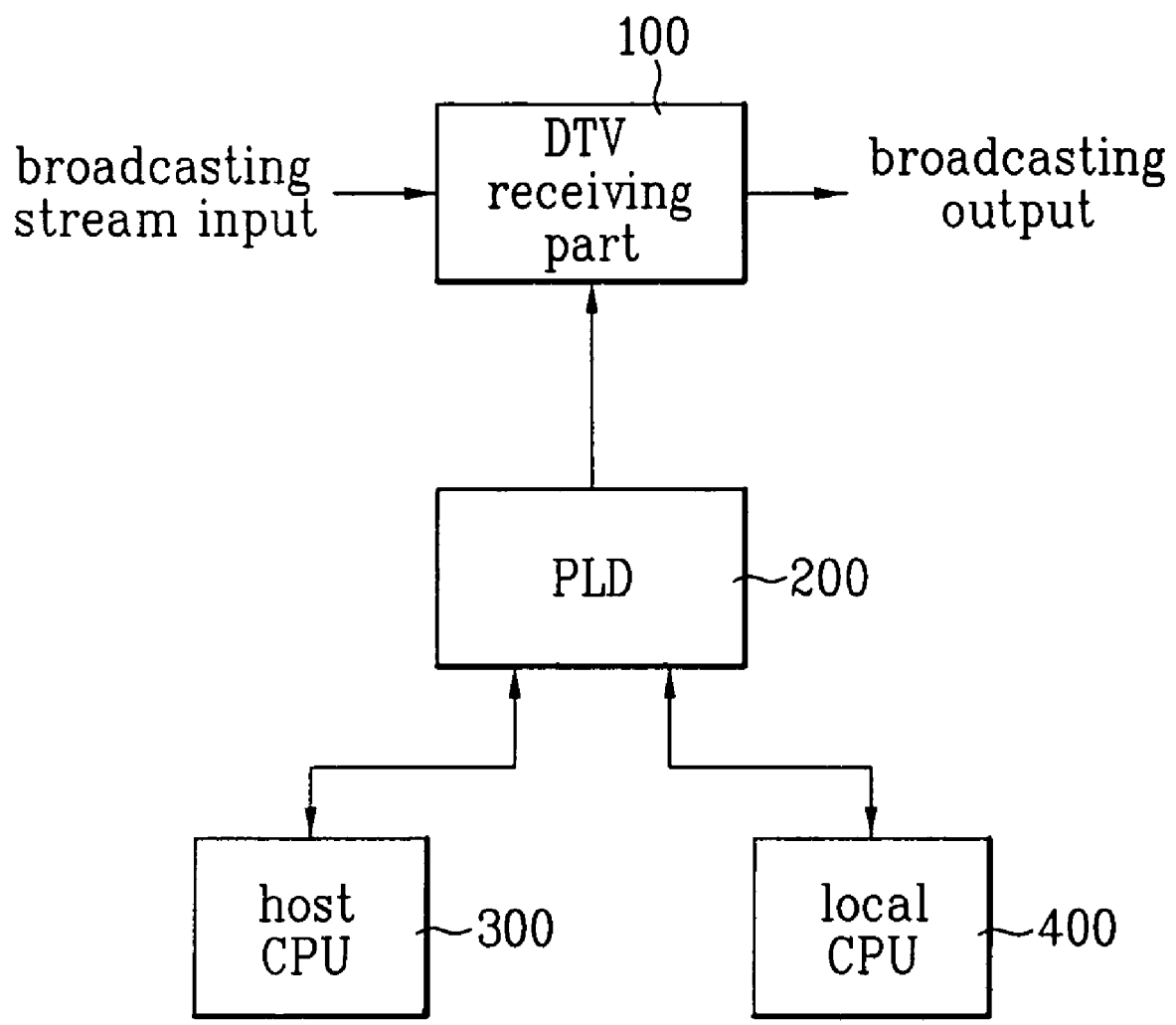
FIG. 1 schematically illustrates a block diagram of a digital TV according to the present invention.

FIG. 1 schematically illustrates a block diagram of a digital TV according to the present invention.

As shown in FIG. 1, the digital TV according to the present invention includes a digital TV receiving part 100 for receiving and decoding a broadcasting stream from an outside to output a digital broadcasting signal to a viewer, a host CPU 300 for controlling the digital TV receiving part 100, a local CPU 400 for controlling the digital TV receiving part 100 if the host CPU 300 operates in an abnormal state, and a programmable logic device (PLD) 200 for switching the control of the digital TV receiving part 100 from the host CPU 300 to the local CPU 400 if the host CPU 300 operates in the abnormal state.

Figure 2:
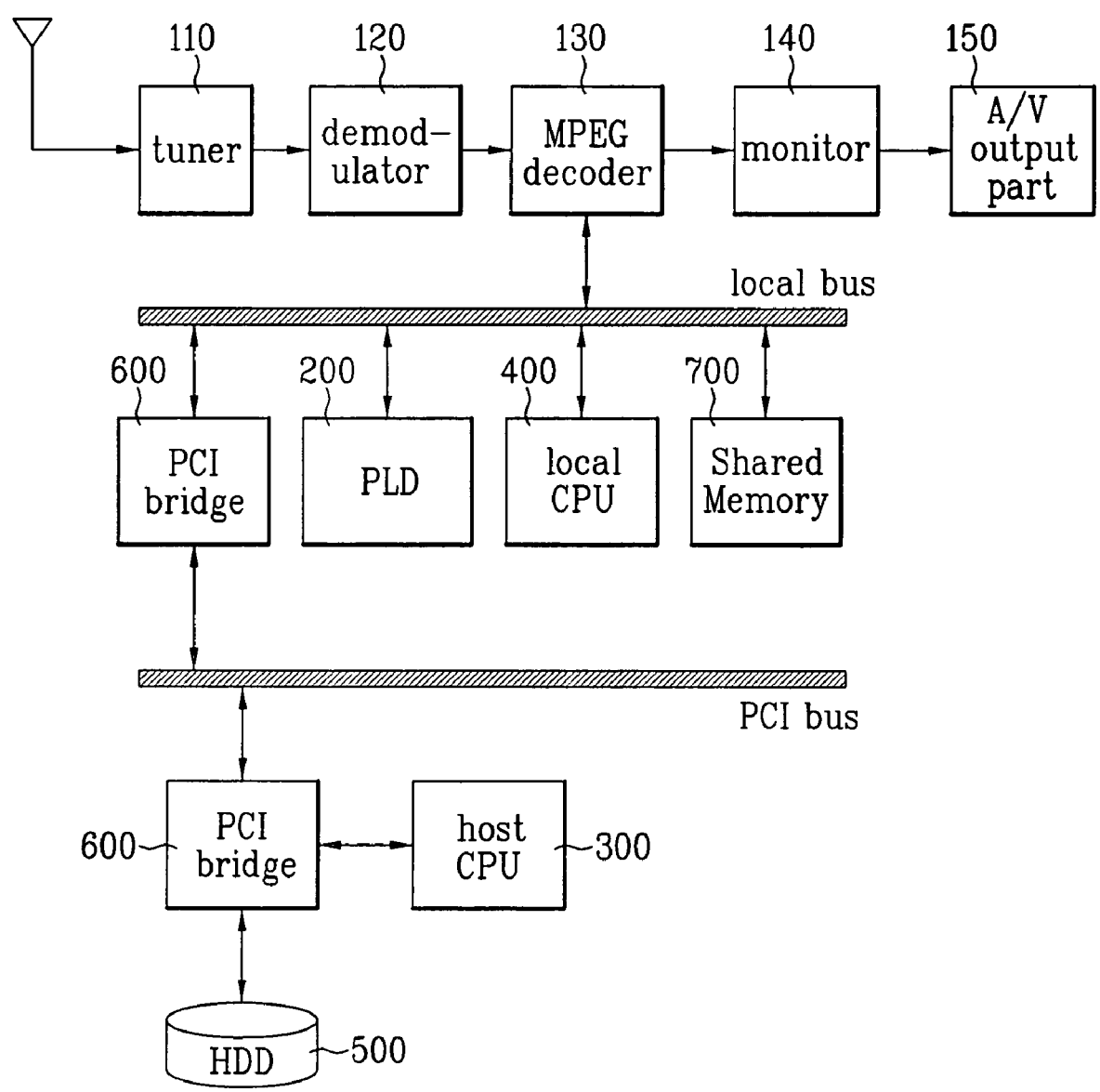
FIG. 2 illustrates a detailed block diagram of a digital TV according to the present invention.

FIG. 2 illustrates a detailed block diagram of a digital TV according to the present invention.

As shown in FIG. 2, the digital TV receiving part 100 includes a tuner 110 for tuning an MPEG stream inputted through an external antenna, a cable or a satellite and detecting a broadcasting stream of a specified frequency band, a demodulator 120 for demodulating the broadcasting stream detected by the tuner 110 and converting the demodulated broadcasting stream into digital data, an MPEG decoder 130 for decoding the digital data demodulated by the demodulator 120, a monitor 140 for displaying a video signal decoded by the MPEG decoder 130, and an audio/video (A/V) output unit 150 for outputting the video signal.

The local CPU 400 and the PLD 200 are connected together through a local bus in the digital TV receiving part 100, and the host CPU 300, which is outside the digital TV receiving part 100, controls the digital TV receiving part 100 through a peripheral component interconnect (PCI) bus.

It is preferable that the digital TV receiving part 100 further includes a shared memory 700 that is periodically accessed by the host CPU and the local CPU at predetermined intervals in order to check whether the host CPU operates in a normal state.

The host CPU 300 forms an interface with the digital TV receiving part 100 through a PCI bridge 600.

The operation of the digital TV as constructed above according to the present invention will be explained in detail with reference to the accompanying drawings.

In FIG. 2, the tuner 110 receives the broadcasting stream from the antenna, the cable or the satellite. The demodulator 120 converts the received broadcasting stream into digital data, and inputs the digital data to the MPEG decoder 130. Then, the MPEG decoder 130 decodes and outputs the inputted MPEG stream to monitor 140 so that the viewer can view the digital broadcast.

At this time, the MPEG decoder 130 may not decode the MPEG stream inputted from the demodulator 120, but may store a transport stream or a packetized elementary stream (PES) obtained by parsing the transport stream in an HDD 500 through the PCI bridge 600.

The broadcasting stream stored in the HDD 500 is read out through the PCI bridge 600 by a user's request, and inputted to the MPEG decoder 130 through the PCI bridge 600 of the digital TV receiving part. The MPEG decoder 130 decodes the broadcasting stream and outputs the decoded stream to the monitor 140.

The host CPU 300 and the local CPU 400 can periodically access the shared memory 700. The shared memory 700 may be provided in the PLD 200. Also, the local CPU 400, which is located in the digital TV receiving part, accesses the shared memory 700 through the local bus, and the Host CPU 300, which is located outside the digital TV receiving part, accesses the shared memory 700 through the PCI bus. Also, the shared memory 700 has a flag area for recording a flag that indicates the operating state of the host CPU 300. The flag may be '1' or '0' according to the operating state of the host CPU 300.

If the operating system operates in a normal state, the host CPU 300 controls the digital TV receiving part through the PCI bus. At this time, a device driver or an application program actually controls the host CPU 300.

Figure 3:
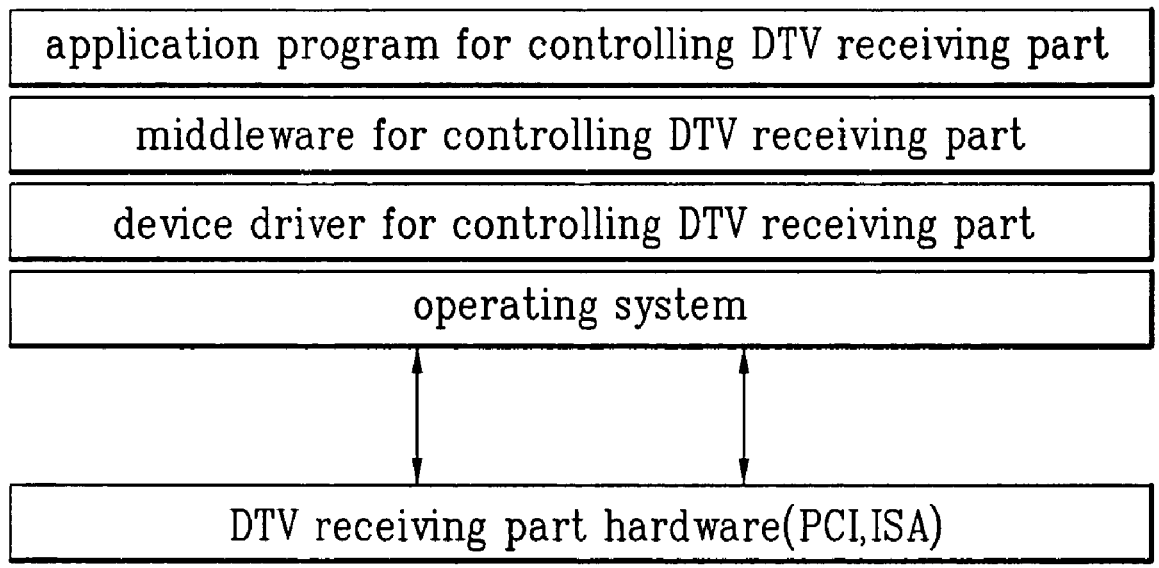
FIG. 3 illustrates a software hierarchy of a digital TV operation system according to the present invention.

FIG. 3 illustrates a software hierarchy structure that controls the digital TV when the digital TV operates in a normal state according to the present invention.

As shown in FIG. 3, the operating system directly manages the hardware of the digital TV receiving part. The device driver executed in the operating system directly controls devices related to the digital TV. The application program on the uppermost part of the hierarchy structure transfers data inputted by the user to middleware that is a lower hierarchy. The middleware transfers the data, which is directly related to the device among the data transferred from the application program, to the device driver. Also, the middleware analyzes and collects information related to channel information or broadcasting programs to create a corresponding table.

However, if the operating system is in the abnormal state due to an error of the application program and so on, the digital TV receiving part cannot be controlled according to the software hierarchy as shown in FIG. 3.

Accordingly, the control of the digital TV receiving part is switched from the host CPU 300 to the PLD 200. The PLD 200 switches the control of the digital TV receiving part over to the local CPU 400 in order to make the local CPU 400 execute firmware for controlling the digital TV receiving part.

The characteristic and the kind of the local CPU 400 may be changed according to the specification of the digital TV. The program executed by the local CPU 400 may be in the form of firmware or an embedded operation system.

If the operating system is in the abnormal state, the control of the digital TV receiving part is assigned from the host CPU 300 to the local CPU 400 as follows.

First, a shared memory 700 that can be commonly accessed by the host CPU 300 and the local CPU 400 should be provided in the digital TV receiving part.

It is preferable that the shared memory 700 is a separate memory device. However, since it is general that the host CPU 300 accesses the digital TV receiving part using a memory-mapped input/output (I/O) system, the shared memory 700 may be accessed through the local CPU 400. Accordingly, the shared memory 700 may be provided in the PLD 200. Also, the shared memory may be provided in a memory area of a local device (i.e., PCI bridge of the MPEG decoder).

Figure 4:
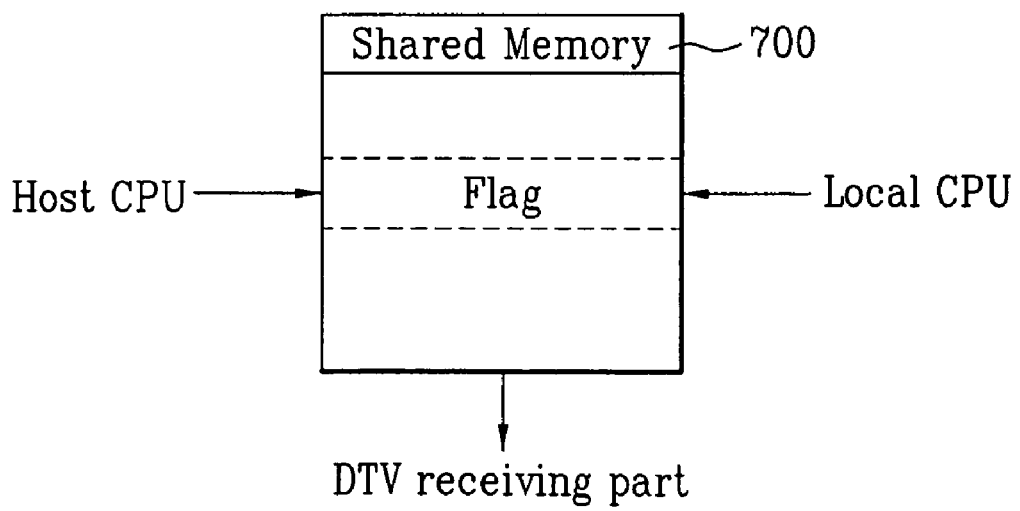
FIG. 4 illustrates a detailed construction of a shared memory of a digital TV according to the present invention.

As shown in FIG. 4, it is preferable that the shared memory 700 has a flag area for recording a flag that indicates the operating state of the host CPU.

While the operating system operates in a normal state, the host CPU 300 periodically records a signal that indicates the operating state of the host CPU, i.e., a flag (in a normal state, it is recorded as '1', and in an abnormal state, it is recorded as '0'), in the flag area by periodically accessing the shared memory 700. After a predetermined time (for example, 30 ms), the local CPU 400 checks the flag area.

If it is checked that the flag area is set to '1', the local CPU 400 judges that the host CPU 300 operates in the normal state, and sets the flag area to '0' for the next judgment.

However, if the flag area is set to '0', the local CPU 400 judges that the host CPU 300 operates in the abnormal state, and executes the firmware for controlling the digital TV receiving part.

If the operating system is in the abnormal state as above, the control of the digital TV receiver is switched from the host CPU 300 to the local CPU 400.

Also, if the control is switched over to the local CPU 400, the local CPU 400 drives a program for channel navigation. As a result, even if the operating system is in the abnormal state, the operation of the digital TV can be continued.

For example, while the operating system of the host CPU 300 is in the abnormal state and the PC is rebooted, the control of the digital TV receiving part is switched from the host CPU 300 to the local CPU 400. At this time, any input of the user can be processed through the local CPU 400. The local CPU 400 periodically checks the flag of the shared memory 700.

If the rebooting of the PC is completed and the host CPU 300 returns to the normal state, the host CPU 300 periodically records "1" in the flag area of the shared memory 700. Then, the local CPU 400 checks that the flag is "1", and judges that the host CPU 300 operates in a normal state. According to a result of checking, the control of the digital TV receiving part is switched from the local CPU 400 to the host CPU 300. At this time, the input of the user is processed through the host CPU 300.

As described above, the digital TV according to the present invention can independently be controlled through the local CPU 400 even if the operating system is in the abnormal state, and thus the viewer can view the digital TV without interruption.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital TV comprising:
    a digital TV receiving part for receiving and decoding a broadcasting stream from an outside;
    a host CPU for controlling the digital TV receiving part;
    a local CPU for controlling the digital TV receiving part if the host CPU operates in an abnormal state;
    a programmable logic device for switching the control of the digital TV receiving part from the host CPU to the local CPU if the host CPU operates in the abnormal state; and
    a shared memory periodically accessed by the host CPU and the local CPU at predetermined intervals in order to check whether the host CPU operates in a normal state.

2. The digital TV of claim 1, wherein the local CPU in the digital TV receiving part may access the shared memory through a local bus, and the host CPU outside the digital TV receiving part may access the shared memory through a peripheral component interconnect (PCI) bus.

3. The digital TV of claim 1, wherein the shared memory has a flag area for recording a flag that indicates an operating state of the host CPU.

4. The digital TV of claim 3, wherein the host CPU records a flag '1' in the flag area for a predetermined period.

5. The digital TV of claim 3, wherein the local CPU periodically checks the flag, and if the checked flag is '0', it judges that the host CPU operates in the abnormal state, and controls the digital TV receiving part, while if the checked flag is '1', it judges mat the host CPU operates in the normal state, and does not control the digital TV receiving part.

6. The digital TV of claim 5, wherein the local CPU periodically checks the flag, and if the checked flag is '1', it changes the flag '1' recorded in the flag area to the flag '0'.

7. A method of driving a digital TV having a host CPU, a local CPU and a shared memory, comprising:
    driving the digital TV through the host CPU;
    periodically recording a flag that indicates an operating state of the host CPU in the shared memory;
    judging whether the host CPU operates in an abnormal state by periodically checking the flag recorded in the shared memory; and
    if it is checked that the host CPU operates in the abnormal state, driving the digital TV through the local CPU instead of the host CPU.

8. The method of claim 7, wherein if it is checked that the host CPU operates in a normal state, the flag recorded in the shared memory is updated.

9. The method of claim 7, further comprising:
    after the step of driving the digital TV through the local CPU, judging whether the host CPU operates in a normal state by periodically checking the flag recorded in the shared memory; and
    if it is checked that the host CPU operates in the normal state, driving the digital TV through the host CPU instead of the local CPU.

10. A method of driving a digital TV having a host CPU, a local CPU and a shared memory, comprising:

driving the digital TV through the host CPU;
periodically recording a flag that indicates an operating state of the host CPU in the shared memory;
periodically checking the flag recorded in the shred memory; and
if it is checked that the flag is '1', judging that the host CPU operates in a normal state and updating the flag as '0', while if it is checked that the flag is '0', judging that the host CPU operates in an abnormal state and driving the digital TV through the local CPU instead of the host CPU.

11. The method of claim 10, further comprising:
after the step of driving the digital TV through the local CPU, periodically checking the flag recorded in the shred memory; and
if it is checked that the flag is '1', judging that the host CPU operates in the normal state, driving the digital TV through the host CPU instead of the local CPU, and updating the flag as '0'.

* * * * *